June 24, 1958 F. H. ROHR 2,840,394
FLEXIBLE JOINT ENGINE EXHAUST DUCT WITH BELLOWS SEAL
Original Filed Oct. 24, 1947 2 Sheets-Sheet 1

FRED H. ROHR
INVENTOR.

BY S. Tierney Jr
ATTORNEY

June 24, 1958        F. H. ROHR        2,840,394

FLEXIBLE JOINT ENGINE EXHAUST DUCT WITH BELLOWS SEAL

Original Filed Oct. 24, 1947        2 Sheets-Sheet 2

FRED H. ROHR
           INVENTOR.

BY S. Tierney Jr
     ATTORNEY

United States Patent Office 2,840,394
Patented June 24, 1958

2,840,394

FLEXIBLE JOINT ENGINE EXHAUST DUCT WITH BELLOWS SEAL

Fred H. Rohr, San Diego, Calif., assignor to Rohr Aircraft Corporation, Chula Vista, Calif., a corporation of California Continuation of abandoned application Serial No. 781,832, October 24, 1947. This application February 14, 1952, Serial No. 271,500

5 Claims. (Cl. 285—226)

This invention relates to an engine exhaust duct, particularly to one using bellows type connections in the exhaust system for flexibly mounted internal combustion engines of airplanes and is a continuation of my application Serial Number 781,832, filed October 24, 1947.

Its objects are to expose the working surfaces or parts of the duct to the cooling effects of captured outside currents of air; to effect better sealing of the working parts under operative conditions; to provide a flexible connection which will not leak under the relatively high pressures and temperatures imposed thereon, and at the same time will utilize internal gas pressure exerted upon the inner walls of the bellows in such a manner as to increase the effectiveness of the seal; to render the parts readily accessible for inspection, adjustment, restoration, replacement and repair; and generally to provide a device which is simple and economical of construction, efficient in action and of prolonged life and durability. These and other objects will appear from the drawing, and as hereinafter described and set forth.

As is well known, the walls of conduit members through which flow hot liquids or gases are subject to thermal expansion upon the passage of such fluids and to contraction after such passage has ceased. In many cases, it has been found necessary, particularly where connections are made between airplane combustion engines and exhaust manifolds, to employ flexible joints which allow expansion and contraction, and which so far as possible provide a seal against the leakage of the hot gases passing therethrough. Also, in such installations, such flexible joints are at times required to sustain bending loads imposed upon the connecting conduit members. It is largely for the purpose of satisfactorily meeting these conditions that my improved bellows type joint has been devised; being an improvement upon my invention of a flexible universal joint as described in my Patent No. 2,502,753 issued April 4, 1950.

My invention primarily consists in the adaption of a metallic telescopic slip joint, similar to that employed in the joint forming the subject matter of the aforesaid patent, for use with a specially improved form of bellows; the construction being such that the direct impingement of hot exhaust gases upon the working surfaces of the bellows and assembly thereof is effectually prevented, while at the same time permitting axial movement of a member of the joint to compensate for thermal expansion or contraction of the parts; also varying the thickness of the walls of the bellows so as properly to distribute the stresses imposed by axial and deflective movements as may be required to sustain bending loads imposed upon connected parts.

My invention also consists in providing a bellows which forms a leaf proof seal for said joint with but little or no loss of flexibility, and at the same time constructing the bellows so that internal gas pressure produced by exhaust gases admitted therein will cause an axial directional force to be developed, which force is mechanically applied to two ball and socket joints in such a manner as to increase the effectiveness of the sealing rings therein contained.

My invention also consists in utilizing for the purpose of preventing leaks and reducing wear and friction in metallic ball and socket joints, anti-friction or friction resistant rings of carbon or carbon containing material, which normally are greater in size or diameter than the recesses or sockets where they are to be installed, and for which installation it is necessary to expand the walls of said recesses or sockets by heat and thereafter, upon cooling, to contract said walls upon said rings.

My invention further consists of other novel features of construction, and combinations and arrangements of elements and parts shown in the drawing and more particularly hereinafter pointed out and claimed.

For a better understanding of the invention, reference is directed to the accompanying drawing, illustrating a preferred form and modifications thereof, in which similar numerals refer to similar parts throughout the several views, and in which;

Figure 5 is a sectional view showing a modified form of bellows convolution and, Figure 6 is a view similar to that shown in Fig. 1, omitting the manifold connection of the duct and showing a form of bellows with only a limited number of convolutions, when necessitated because of limited space for installation and where only a limited axial movement is to be provided for.

Figure 1:
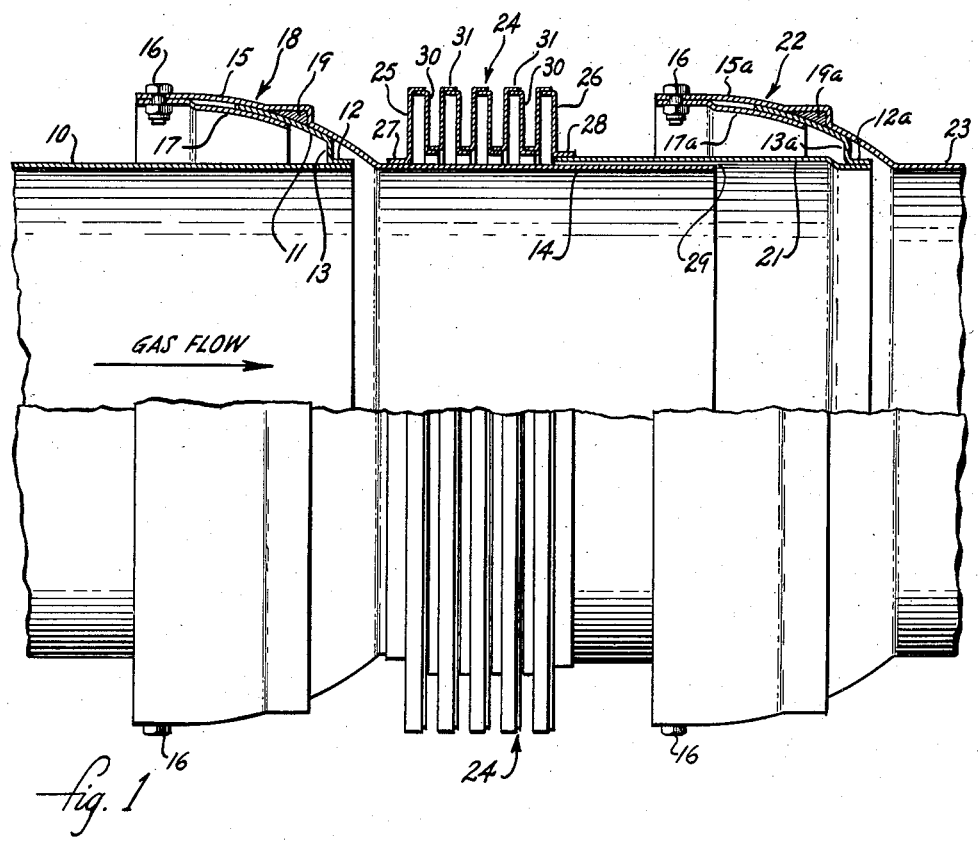
Figure 1 is a side elevation, partly in section, of a preferred form of my improved duct, showing a special form of bellows permitting axial movement of one of the conduits connected thereby.

The illustrated embodiment of the invention shows a metallic duct comprising a cylindrical conduit 10 whose upstream end is rigidly connected to the exhaust manifold ring or exhaust port (not shown) of an internal combustion engine flexibly mounted on an airplane nacelle. Welded to the end of conduit 10 is a ball member 11 of spherical shape and whose end is bent to form a cylindrical ring 12 which is welded to the end of conduit 10. Ball 11 is flared continually outward in a direction toward the upstream end of conduit 10 thereby providing a wide annular recess 13 between the ball and conduit 10 within which is received a normally flowing stream of coolant air from a source (not shown). A second cylindrical conduit 14 has its upstream end disposed closely adjacent the end of conduit 10 and carries an integrally formed socket member 15 of spherical shape and in frictional engagement with the peripheral surface of ball 11. Secured to the end of socket 15 by a series of spaced apart bolts 16 or other known type of securing means is a retainer 17 having a generally spherical shaped surface in engagement with the inner surface of ball 11, the said ball and socket members forming a universal joint 18 connecting the conduits 10 and 14. Retainer 17 assists in maintaining ball 11 and socket 15 in firm engagement with each other and also serves to deflect the coolant air stream against ball 11 to prevent an excessive rise in its temperature.

To reduce the friction between and wear of the contacting surfaces of ball 11 and socket 15, I provide an anti-friction ring 19 composed of carbon, carbon-graphite or other carbon containing material such as cast iron, an annular recess 20 being provided in the wall of socket 15 to receive ring 19. The inner surface of ring 19 is preferably of spherical shape to conform to and make sliding contact with the outer surface of ball 11 (see Fig. 2).

Preferably, for this anti-friction or friction resistant ring 19 I employ a carbon ring, the material of such ring being particularly adaptable for the purpose because of its light weight, low cost, and lubricating qualities, because of its being non-corrosive by water or the exhaust gases, and because of its resilient qualities in the presence of the great range of temperatures (900° to 1500° F.) to which it may be exposed. Normally, the outside diameter of the ring 19 is larger than the inside diameter of the recess 20 in which said ring is to be seated, and to install the same it becomes necessary to heat the metal wall of the socket 15 containing said recess so as to expand the wall sufficiently to permit the insertion of the ring in the recess. On cooling, the wall contracts around the ring, which has the resilient property of slight compressibility and expandability; and upon the wall cooling after the application of heat the ring contracts sufficiently to follow such wall and to continue to fill the cavity of the recess. The temperatures employed for expanding the wall of the said recess are higher than the operating temperatures to be encountered in the use of the joint as an exhaust connection for combustion engines, with the result that there can be no movement of the ring in its retaining recess or socket 15 at such operating temperatures. Leaks are thus prevented from occurring through the contact of the outer wall of the ring with the adjacent wall of the recess, and possible fracture of the ring (the carbon mass of which is delicate without reinforcement) is prevented; the ring preferably being always under compression, both at operating and non-operating temperatures. This is an important feature, since it has been discovered that without said confinement and constant compression, the ring is likely to fracture under tension or impact loads.

Conduit 14 has a telescopic, sliding fit with a conduit 21 the downstream end of which is connected by a ball and socket joint 22 with the upstream end of a discharge or outlet conduit 23 whose downstream end (not shown) is connected with any conventional means for discharging the exhaust gas to the atmosphere. The construction of the universal or ball and socket joint 22 is similar to that of joint 18 and its component parts are designated by the same numerals with the suffix a.

Figure 3:
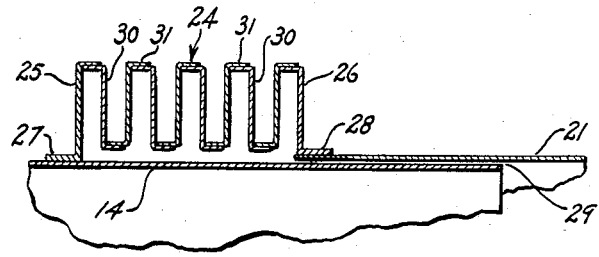
Figure 3 is an enlarged view of the convolutions of the bellows shown in Fig. 1.

Encompassing the upstream portion of conduit 14 is a metallic bellows 24 having radially extending end rings 25, 26 provided with cylindrical rims 27, 28 which are welded to conduits 14 and 21 respectively. The bellows thus forms a sealed chamber around the slip joint 29 between the telescopic conduits 14—21. As shown in Figs. 1 and 3, the bellows has a successive number of similar intermediate rings 30, each of which rings is provided top and bottom with rims oppositely extending at right angles therefrom; which rims engaging with the rims of adjacent rings are secured in such a manner as to be sealed thereto, forming the continuous flat faced convolutions 31 in squared crown formation, and being a departure from the usual arcuate convolutions of metallic bellows formed by the rolling of a one piece tube, and commonly known as the "semi-circular crown type" of bellows. My pieced square crown type has in certain installations superiority over that of the rounded crown, in that the flat surfaces of the convolutions of my improved bellows allow continuous seam welding as a means of fabrication, and permit reduced outside diameter for any given amount of flexibility. There is a practical limit to the depth to which the convolutions of the rounded crown type can be drawn, whereas the pieced square crown type can be made to any desired depth. Furthermore, only the square crown type is adaptable to overlap welding. In fine, my improved bellows assembly is of such design as to make possible the fabrication of larger bellows sections than has heretofore been deemed possible. As so constructed, the convolutions 31 of the bellows 24 are capable, in the same manner as the pleats of an accordion, of being compressed or expanded in the direction of the axis thereof, coincident with the normal axis of the several conduits, or of being deflected or bent from such direction to accommodate and follow any rocking movement of the sliding conduits 14—21.

Figure 4:
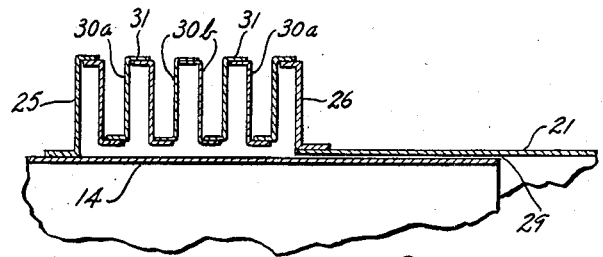
Figure 4 is an enlarged view similar to that shown in Fig. 3, but showing a modification in the thickness of the walls of said convolutions specially adapting the same for axial deflection and bending loads.

Preferably as shown in Fig. 3, the end rings 25 and 26 are thicker and of much more sturdy construction than the rings 30, so as to obtain the required axial movement of the joint and deflection thereof and to afford proper stress distribution in the bellows system. Also, if desired the thickness of the pairs of rings may be made to decrease toward the center of the bellows, as shown in Fig. 4, in order further to provide axial movement and proper stress distribution in the bellows. Thus, as shown, the end rings 25 and 26 are of quite heavy construction, rings 30a are of less thickness, and the rings 30b are thinnest of all. In this way it is possible for this form of bellows to accommodate misalignment in the conduit members or to allow rocking of the sleeve joint and bending deflection of the body of said bellows. Also the pieced square crown type of bellows permits in its construction the use of convolution walls of different or varying thicknesses, a feature practically impossible of accomplishment with the one piece type of bellows, whether formed with square or rounded crown.

Figure 5:
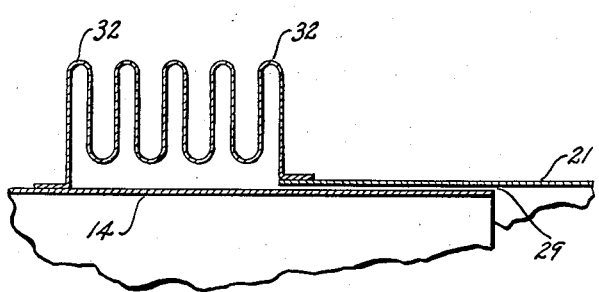

In certain installations a bellows having rounded convolutions 32 as shown in Figure 5 is adequate to connect the conduits 14 and 21 and seal the slip-joint 29.

Figure 2:
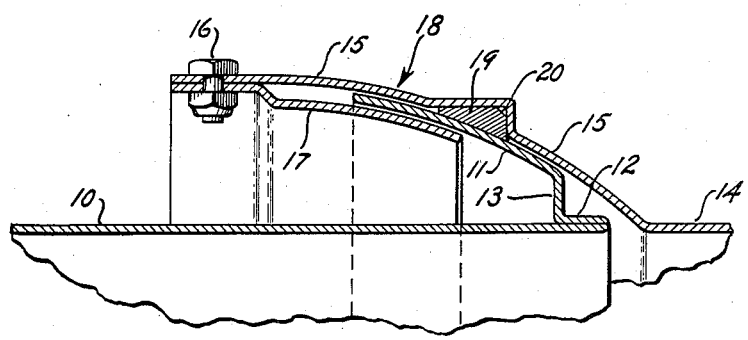
Figure 2 is an enlarged sectional view of one of the ball and socket joints shown in section in Fig. 1.
Figure 6:
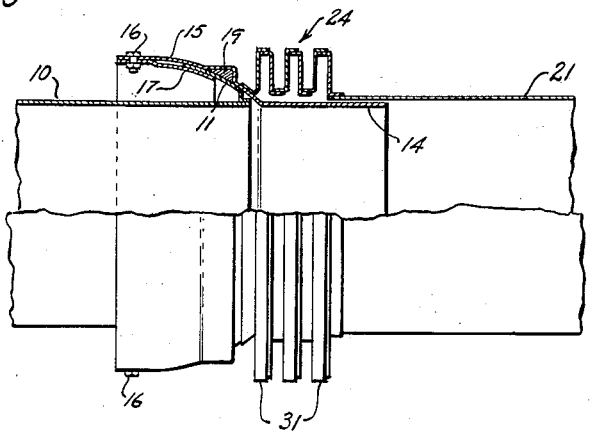

Figure 6 shows a construction in which only three convolutions 31 are used in the bellows 24, the rest of the duct structure being of the type disclosed in Figures 1 and 2. This modified form is primarily designed for use where the space available for installation is cramped or limited.

When the combustion engine is started, due to its vibration conduit 10 will move towards and away from conduit 23 and also to one side and then the other side of the central axis of the duct. Any such sidewise movement is accommodated by rotational movement of the ball and socket members which permit movement of conduit 10 with reference to conduit 23, as is apparent. The axial movement of conduit 10 causes conduit 14 to slide along conduit 21 at the slip joint 29. If these conduits are manufactured to close tolerance limits there may be no gas leakage through the slip joint and no pressure would build up in bellows 24. In modern airplane engines exhaust gas temperatures as high as 1500° F. are encountered and due to slow oxidation of the conduits 14 and 21 and wear of the portions of these conduits which rub together due to engine vibration and contraction and expansion due to large temperature changes, leakage of gas may eventually take place through slip joint 29. The large overlap of conduit 14 on conduit 21 prevents the exhaust gases from impinging upon the inner walls of the bellows convolutions and heating them to the high temperature of the exhaust gas. Gas leakage through the slip-joint gradually builds up a pressure in bellows 24, forcing its convolutions further apart and causing socket member 15 and anti-friction ring 19 to be pressed more firmly against ball 11 and seal the joint between these members if any small leakage exists between them or to more effectually seal it if there is no leakage. Expansion of the bellows similarly causes ball member 11a to press more firmly against socket 15a and anti-friction ring 19a and more effectually seal the joint. Wear of the members constituting the ball and socket joints 18 and 22 is thus automatically compensated for by leakage of gas into the bellows and axial expansion thereof. All the parts heretofore described except the rings 19 and 19[1] are preferably made of heat-resistant metal such as stainless steel which corrodes only slowly even at high temperature. All the parts of the duct including both ball and socket joints 18—22 and bellows 24 are exposed to the coolant air stream around it. There is nothing around any part of the duct to prevent the free radiation of heat and the loss of heat by radiation in addition to that conveyed away by the air stream prevents the temperature of its parts from becoming excessively high.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. A duct adapted to convey hot exhaust gas away from an internal combustion engine comprising, in combination: a first metallic conduit arranged to receive the hot exhaust gas at its upstream end, a second metallic conduit of cylindrical shape having its upstream end disposed adjacent the downstream end of said first conduit; means comprising cooperating ball and socket members connecting the downstream end of said first conduit to the upstream end of said second conduit; a third metallic cylindrical conduit with its upstream end continually in sliding, telescopic contact with the downstream end of said second conduit to form a slip joint therewith; a fourth metallic cylindrical conduit with its upstream end disposed adjacent the downstream end of said third conduit; means comprising cooperating ball and socket members connecting the downstream end of said third conduit to the upstream end of said fourth conduit; and an axially expansible metallic bellows, the entire bellows being disposed between and spaced axially from both of said ball and socket members, said bellows comprising a plurality of spaced apart thin radially extending flexible rings, the flexible ring at one end of the bellows having an integral cylindrical projecting rim in contact with and secured to the outer surface of the second conduit and the flexible ring at the opposite end of the bellows having an integral cylindrical projecting rim in contact with and secured to the outer surface of the third conduit near the upstream end thereof, the flexible rings intermediate said end rings having inner portions which interconnect successive rings and are spaced a substantial distance outwardly from said second conduit, said bellows forming a sealed chamber arranged to receive any gas leakage passing through said slip joint, the increase in pressure in the bellows due to such leakage automatically causing an axial expansion of the bellows and a resulting increase in pressure between both of said ball and socket members, both of said ball and socket members being exposed to a cooling current of ambient air.

2. A duct adapted to convey hot exhaust gas away from an internal combustion engine comprising, in combination: a first metallic conduit adapted to receive the hot exhaust gas at its upstream end; a ball member connected to the downstream end of said conduit and having a spherical peripheral surface; a second metallic conduit of cylindrical shape having its upstream end disposed adjacent the downstream end of said first conduit; a socket connected to the upstream end of said second conduit, said socket having a continuous circular recess disposed opposite said spherical surface; an anti-friction ring seated in said recess and having a spherical contact surface in contact with said spherical ball surface; a third metallic cylindrical conduit with its upstream end continually in sliding, telescopic contact with the downstream end of said second conduit to form a slip joint therewith; a fourth metallic conduit with its upstream end disposed adjacent the downstream end of said third conduit; means comprising cooperating ball and socket members connecting the downstream end of said third conduit to the upstream end of said fourth conduit; and an axially expansible metallic bellows, the entire bellows being disposed between and spaced axially from said ball members, said bellows comprising a plurality of spaced apart thin radially extending flexible rings, the flexible ring at the upstream end of the bellows having an integral cylindrical projecting rim in contact with and secured to the outer surface of the second conduit and the flexible ring at the downstream end of the bellows having an integral projecting rim in contact with and secured to the outer surface of the third conduit near the upstream end thereof, the flexible rings intermediate said end rings having inner portions which interconnect successive rings and are spaced a substantial distance outwardly from said second conduit, said bellows forming a sealed chamber arranged to receive any gas leakage passing through said slip-joint, the increase in pressure in the bellows due to such leakage automatically causing an axial expansion of the bellows and a resulting increase in pressure of said ring against the ball surface it contacts, both of said ball and socket members being exposed to a cooling current of ambient air.

3. An exhaust gas duct as claimed in claim 2; in which said anti-friction ring has a diameter at normal atmospheric temperature slightly greater than the diameter of the circular recess in which it is seated.

4. A duct adapted to convey hot exhaust gas away from an internal combustion engine comprising, in combination: a cylindrical metallic conduit adapted to receive the exhaust gas at its upstream end; a thin metallic ball member having its downstream end connected to the downstream end of said conduit, said ball member having a skirt portion extending toward the upstream end of said conduit and spaced therefrom to provide a recess in which coolant air may circulate, said skirt portion having a spherical peripheral surface; a second metallic conduit of cylindrical shape having its upstream end disposed adjacent the downstream end of said first conduit; a socket connected to the upstream end of said second conduit, said socket having a continuous circular recess therein; an anti-friction ring seated in said recess and having a curved contact surface in frictional engagement with said spherical surface; a thin metallic retainer having one end secured to the upstream end of said socket, said retainer being shaped to engage the inner face of said skirt portion at a region opposite said anti-friction ring; a third metallic conduit having a cylindrical upstream end in sliding, telescopic contact with the outer surface of the downstream end of said second conduit to form a slip joint therewith; a fourth metallic conduit with its upstream end disposed adjacent the downstream end of said third conduit; means comprising cooperating ball and socket members connecting the downstream end of said third conduit to the upstream end of said fourth conduit, both of said ball and socket members being exposed to the temperature of the ambient air when hot exhaust gas is passing through the duct; and an axially expansible metallic bellows, the entire bellows being disposed between and spaced axially from said ball members, one end of said bellows being attached circumferentially to said second conduit and the opposite end thereof being attached circumferentially to said third conduit, the entire inner surface of said bellows intermediate said ends being spaced a substantial distance outwardly from said second conduit, said bellows forming a sealed chamber arranged to receive any gas leakage passing through said slip-joint, the increase in pressure in the bellows due to such leakage automatically causing an axial expansion of the bellows and a resulting increase in pressure of said ring against said spherical ball surface.

5. A duct adapted to convey hot exhaust gas away from a movable internal combustion engine comprising, in combination: a first metallic conduit adapted to receive the hot gas at its upstream end; a second metallic conduit of cylindrical shape having its upstream end disposed adjacent the downstream end of said first conduit, cooperating ball and socket members constructed to pivotally connect the adjacent ends of said conduits; a third metallic conduit having an upstream end which is cylindrical and whose inner cylindrical face has continual telescopic contact for a substantial distance in an axial direction with the outside cylindrical face of said second conduit to form a slip joint therewith; a fourth metallic conduit with its upstream end disposed adjacent the downstream end of said third conduit; second cooperating ball and socket members constructed to pivotally connect the adjacent ends of said third and fourth conduits; and an axially expansible metallic bellows disposed between and spaced axially from said ball members, said bellows having a plurality of convolutions; and means hermetically connecting the end convolutions of the bellows to said second and third conduits to provide a sealed chamber around said slip joint to receive any gas leakage passing therethrough, the convolutions of said bellows intermediate said end convolutions being spaced a substantial distance outwardly from said second conduit, both of said ball and socket members and said bellows being exposed to a cooling air current which lowers their temperature below that of the exhaust gas passing through the duct.

References Cited in the file of this patent

UNITED STATES PATENTS

| | | |
|---|---|---|
| 1,726,483 | Giesler | Aug. 27, 1929 |
| 2,172,612 | Hassenkamm | Sept. 12, 1939 |
| 2,242,604 | Wells | May 20, 1941 |
| 2,337,038 | Fentress | Dec. 21, 1943 |
| 2,381,426 | Allen et al. | Aug. 7, 1945 |
| 2,417,250 | Harvey | Mar. 11, 1947 |
| 2,451,252 | Stoeckly | Oct. 12, 1948 |
| 2,502,753 | Rohr | Apr. 4, 1950 |
| 2,604,339 | Kaysing et al. | July 22, 1952 |
| 2,616,278 | Pitt | Nov. 4, 1952 |
| 2,712,456 | McCreery | July 5, 1955 |

FOREIGN PATENTS

| | | |
|---|---|---|
| 694,163 | Germany | Aug. 23, 1940 |
| 100,253 | Sweden | Nov. 12, 1940 |